United States Patent [19]

Hosoya

[11] 4,413,274
[45] Nov. 1, 1983

[54] COLOR SYNCHRONIZING CIRCUIT

[75] Inventor: Nobukazu Hosoya, Nara, Japan

[73] Assignee: Sanyo Electric Co., Ltd., Osaka, Japan

[21] Appl. No.: 299,117

[22] Filed: Sep. 3, 1981

[30] Foreign Application Priority Data

Sep. 11, 1980 [JP] Japan .............................. 55-127583

[51] Int. Cl.³ ............................................. H04N 9/50
[52] U.S. Cl. .................................................... 358/25
[58] Field of Search ...................... 358/19, 25; 331/18, 331/25, 36 R

[56] References Cited

U.S. PATENT DOCUMENTS 2,857,456  10/1958  Humphrey ........................... 358/25
2,956,112  10/1960  O'Toole .............................. 358/19

Primary Examiner—Richard Murray
Attorney, Agent, or Firm—Armstrong, Nikaido, Marmelstein & Kubovcik

[57] ABSTRACT

A color synchronizing circuit comprises a phase locked loop which includes a voltage controlled oscillator including a ceramic vibrator. Phase comparison is made of an intermittent color burst and the output of the voltage controlled oscillator and the phase comparison output is applied to a low pass filter. The low pass filter provides a control voltage associated with the phase difference of these two signals to the voltage controlled oscillator. The frequency variable range $\Delta f$ of the voltage controlled oscillator is selected such that a relation $\Delta f < \pm f_H$ is met with respect to the repetition frequency $f_H$ of the color burst. The low pass filter comprises a dual time constant circuit, which sufficiently attenuates a beat signal from the phase comparator, thereby to make narrow the pull-in range of the phase locked loop. On the other hand, a sawtooth waveform voltage of a stepwise fall is obtained from a sweeper circuit and is applied to the voltage controlled oscillator together with the output voltage from the low pass filter as a control voltage.

39 Claims, 30 Drawing Figures 3.579545MHz

COLOR SYNCHRONIZING CIRCUIT

BACKGROUND OF THE INVENTION

1. Field of the Invention

The present invention generally relates to a color synchronizing circuit. More specifically, the present invention relates to a novel color synchronizing circuit for use in a color television receiver and a video reproducing apparatus such as a video disc apparatus or the like.

2. Description of the Prior Art

Since a color television signal is transmitted with a color signal carrier (a color subcarrier wave) suppressed, it is necessary to generate on the part of a receiver a color subcarrier wave of 3.579545 MHz being applied to a color demodulator (which generally comprises an R-Y demodulator and a B-Y demodulator) for the purpose of demodulation of a color signal by means of synchronous detection in a receiver. Accordingly, it is necessary to accurately control an oscillator for generating a color subcarrier wave with a color burst. It has been a common practice to employ a phase locked loop type color synchronizing circuit in which a color subcarrier wave generator is implemented by a voltage controlled oscillator, the phase of the output of the voltage controlled oscillator and the phase of the color burst extracted from the received signal are compared and the frequency and the phase of the voltage controlled oscillator are controlled responsive to the comparison output.

Such a color synchronizing circuit employing a phase locked loop is well known as an automatic phase control system, often simply referred to as an APC system. A conventional APC system has adopted a quartz vibrator as an oscillating unit for a voltage controlled oscillator. A quartz vibrator has a large quality factor and hence has an extremely small frequency deviation $\Delta f$ up to a 3 dB attenuation point. For this reason a frequency variable range of the voltage controlled oscillator is as wide as $\pm 700$ Hz. On the other hand, the color burst of a color television signal is generally transmitted with a stabilized frequency. However, in the case of a video disc and other video reproducing apparatus, for example, a color burst is not always reproduced with stability but rather a frequency deviation is unavoidably involved. Even in the case of television broadcasting, an apparent frequency deviation takes place in the color burst in the case where a reception electric field intensity is weak or an external noise is large. A conventional APC system involved a problem that a frequency variable range of a voltage controlled oscillator is narrow, which makes it difficult to well follow a frequency deviation of a color burst as described above. As another approach in utilizing a conventional quartz vibrator, two quartz vibrators have been used to widen the frequency variable range. However, since quartz vibrators are expensive, employment of such expensive quartz vibrators makes expensive a color synchronizing circuit itself as a matter of course.

SUMMARY OF THE INVENTION

Briefly described, the present invention comprises a color synchronizing circuit including a phase locked loop, wherein a frequency variable range ($\Delta f$) of a voltage controlled oscillator is selected to be in a predetermined relation ($\Delta f < \pm f_H$) with respect to a repetition frequency ($f_H$) of the color burst and a control voltage associated with a phase difference between the intermittent color burst and the output of the voltage controlled oscillator is applied to the voltage controlled oscillator. The frequency pull-in range of the phase locked loop is made narrow, while the control voltage being applied to the voltage controlled oscillator is forcedly changed.

According to the present invention, a less expensive ceramic vibrator is utilizable in place of a conventional quartz vibrator as a vibrator for use in the voltage controlled oscillator. Employment of such ceramic vibrator makes it possible to well follow a frequency deviation of the color burst. The reason is that a ceramic vibrator has a small quality factor as compared with that of a quartz vibrator and has a frequency variable range as large as approximately ten times that of a quartz vibrator. Nevertheless, in employment of a ceramic vibrator, a problem is encountered that the anti-noise characteristic of the phase locked loop is degraded. Therefore, the present invention comprises means for making narrow a frequency pull-in range of the phase locked loop, so that an anti-noise characteristic on the occasion of a weak electric field intensity is made commensurate with that in the case of employment of a conventional quartz vibrator. A much narrower frequency pull-in range causes a problem that the phase locked loop becomes difficult to be stably locked and therefore the present invention is adapted to forcedly change a control voltage being applied to a voltage controlled oscillator, so that the phase locked loop is stably locked in spite of a much narrowed frequency pull-in range.

Meanwhile, in order to make narrow the frequency pull-in range of the phase locked loop, a low pass filter for generating a direct current voltage associated with the output of a phase comparator is implemented as a dual time constant circuit by way of an example.

In a preferred embodiment of the present invention, not only an output voltage from a low pass filter but also a sweep voltage of a sawtooth waveform having a rise of a predetermined slope and a fall of a predetermined slope are applied as a control voltage for a voltage controlled oscillator. As such a sweep voltage, not a mere pure sawtooth waveform but a sawtooth waveform having a stepwise fall slope is employed. By thus employing a sawtooth waveform voltage having a stepwise fall slope as a sweep voltage, the sweep voltage maintains a predetermined value at each of predetermined time periods and therefore a phase locked loop is assuredly locked even in the case where an intermittent signal such as color burst is used as a reference signal. Meanwhile, each of the time periods when the sweep voltage is maintained a constant voltage is selected to be approximately eight times the horizontal period, for example. The amplitude of a sawtooth waveform sweep voltage is made dependent on the base/emitter voltage of a transistor in conduction. By doing so, it is possible to compensate for a decrease of the quality factor of the voltage controlled oscillator due to a termperature change. Accordingly, the frequency variable range ($\Delta f$) of the voltage controlled oscillator can be stably maintained in a relation of $\Delta f < \pm f_H$ with respect to the repetition frequency ($f_H$) of the color burst.

An auxiliary circuit is provided in a color killer circuit. When switching selection of reception is made from a broadcast wave of a normal electric field intensity to a broadcast wave of a weak electric field intensity instataneously the operation of the color amplifier is brought to a stop by means of the auxiliary circuit, whereby a color noise on the screen is immediately removed.

A high impedance means such as an emitter follower, an emitter grounded amplifier, or the like is utilized as a load of a phase comparator, i.e. as an input of a low pass filter. As a result, an unnecessary discharge of the low pass filter can be suppressed as much as possible and jitter of a phase locked loop can be effectively corrected. More specifically, in the case of a phase locked loop receiving an intermittent color burst as a reference input, a phase comparison output is intermittent and therefore discharge of an integrating circuit of a low pass filter causes large jitter; however, such discharge can be decreased to a minimum by means of a high impedance means and as a result such jitter as described above can be drastically mitigated.

In employing a sweep voltage having a rise and a fall, only the fall portion is utilized. Accordingly, the rise of the sweep voltage is not effective on a color synchronizing operation. The phase locked loop, the color killer circuit and the automatic color control detecting circuit are disabled during a time period of the rise of the sweep voltage when the sweep voltage is not effective on the color synchronizing operation. As a reslt, a smoothing or integrating capacitor belonging to these circuits are prevented from being placed in an abnormal state.

Accordingly, a principal object of the present invention is to provide a novel color synchronizing circuit, wherein a much less expensive vibrator can be employed while a stabled color synchronization can be achieved.

One aspect of the present invention resides in a color synchronizing circuit wherein a much less expensive ceramic vibrator is utilized in place of a conventional quartz vibrator by way of a vibrator for use in a voltage controlled oscillator of a phase locked loop.

Another aspect of the present invention resides in a color synchronizing circuit comprising a phase locked loop that can well follow frequency deviation of a color burst.

A further aspect of the present invention resides in a color synchronizing circuit wherein a phase locked loop is assuredly locked even in the case where an intermittent signal is received as a reference input.

Still a further aspect of the present invention resides in a color signal circuit wherein a color noise does not take place on the screen even in the case where an operation is shifted from a state of an input color signal being strong to a state of an input color signal being weak.

These objects and other objects, features, aspects and advantages of the present invention will become more apparent from the following detailed description of the present invention when taken in conjunction with the accompanying drawings.

DESCRIPTION OF THE PREFERRED EMBODIMENTS

In the following the embodiments of the present invention will be described by taking examples of a color synchronizing circuit of an NTSC system color television receiver. However, it is pointed out that the present invention can be equally applied to any other types of color video reproducing apparatuses such as a video disc apparatus and the like.

Figure 1:
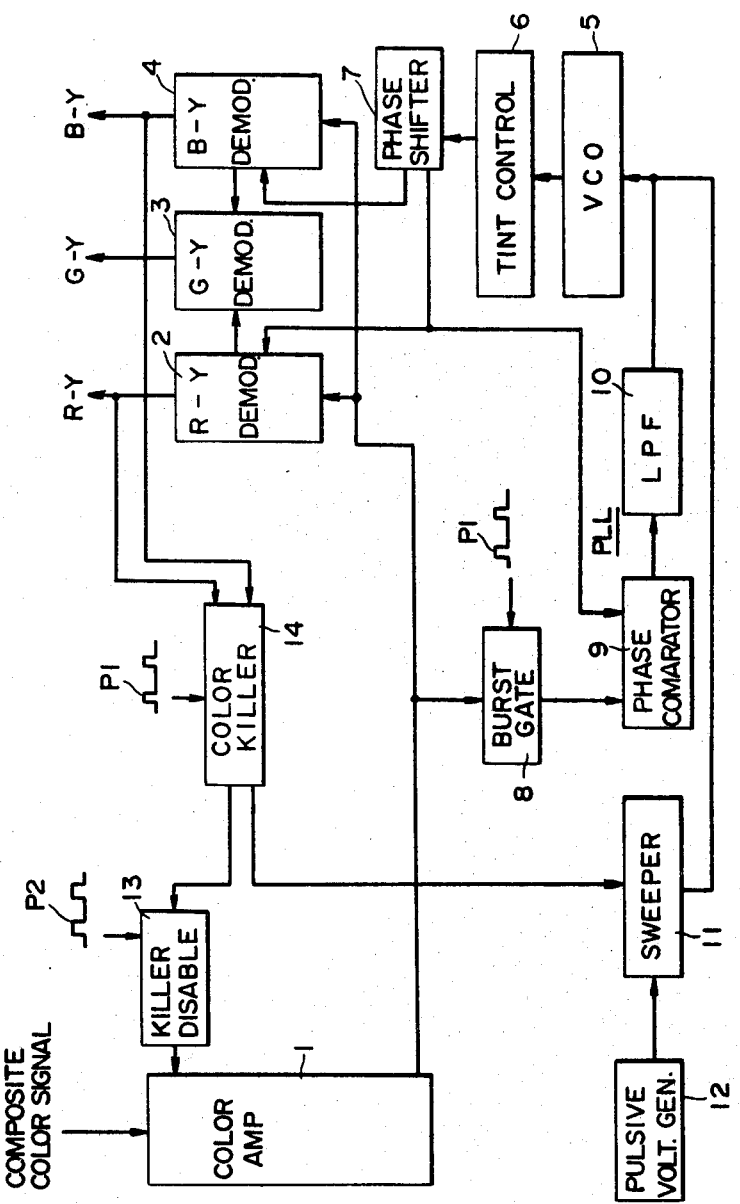
FIG. 1 is a block diagram of a color synchronizing circuit and associated circuits therewith.

FIG. 1 shows the inventive color synchronizing circuit and those circuits associated therewith. The reference numeral 1 denotes a color amplifier for amplifying a composite color signal including a carried color signal and a color burst being supplied through a bandpass circuit. The color amplifier usually comprises a manually operable gain adjusting means, an automatic gain control means operable responsive to an automatic color control, and the like. An automatic color control is often simply referred to as "ACC". The reference numeral 5 denotes a voltage controlled oscillator for generating a color subcarrier wave of 3.579545 MHz, the output of which is supplied through a tint control circuit 6 for manually enabling hue adjustment and a phase shifter 7 to an R-Y demodulator 2 and a B-Y demodulator 4, with a predetermined phase difference of generally 90° therebetween, and is also applied to a phase comparator 9. The phase comparator 9 serves to compare phases of a color burst extracted by a burst gate 8 from the composite color signal obtained from the output of the color amplifier 1, and the above described color subcarrier wave. The output of the phase comparator 9 is applied through a low pass filter 10 to the voltage controlled oscillator 5 as a control voltage. The reference numeral 11 denotes a sweeper circuit provided for assuring color synchronization by the output of the above described phase comparator 9 and is adapted to provide a stepwise sweep voltage waveform as to be described subsequently. The reference numeral 12 denotes a means for providing a pulse voltage of a predetermined frequency (for example a repetition frequency of the color burst $f_H/16$ in the case where the horizontal frequency is $f_H$) for making stepwise the output of the above described sweeper circuit 11. The reference numeral 14 denotes a color killer circuit responsive to the output of the B-Y demodulator 4 and the output of the R-Y demodulator 2 or the G-Y demodulator 3 during the color burst period for disabling a function of the color amplifier 1 on the occasion of reception of monochrome broadcasting or on the occasion of abnormal reception of color broadcasting. The output of the color killer circuit 14 is simultaneously applied to the sweeper circuit 11 to disable the sweeper circuit 11 on the occasion of normal reception (such as in proper color synchronization) of the color broadcasting and otherwise to enable the same. The reference numeral 13 denotes a killer ineffective rendering means responsive to the pulse P2 for rendering ineffective the killer output being applied to the color amplifier 1 during the color burst period or the horizontal blanking period including the color burst, thereby to prevent the color amplifier 11 from being abled during at least a color burst period even when the color amplifier 1 is to be disabled.

Figure 2:
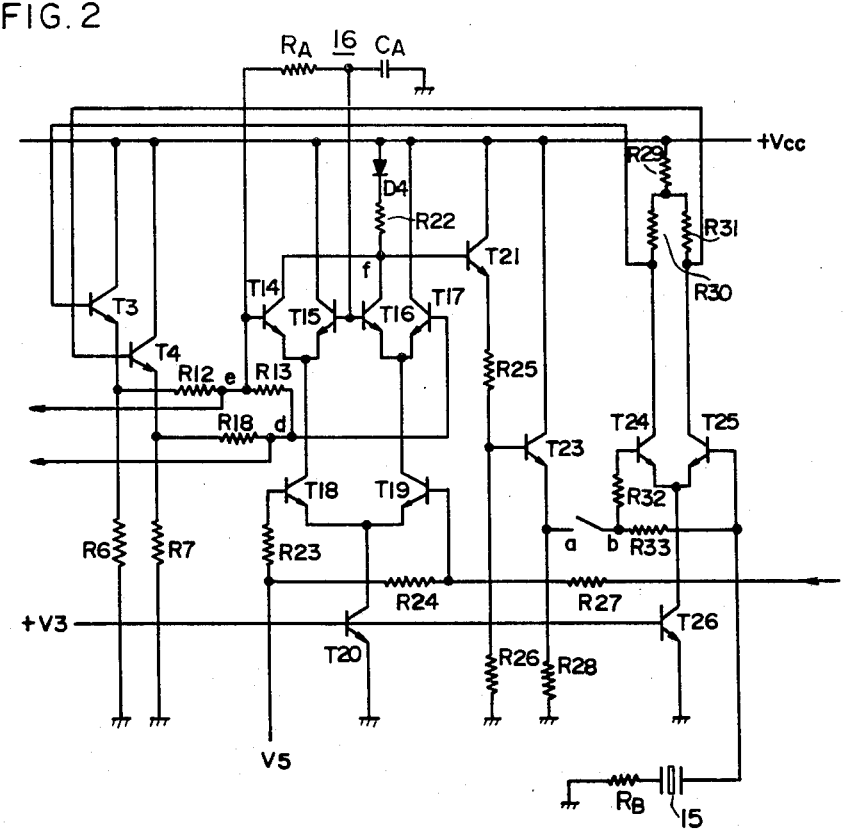
FIG. 2 is a schematic diagram of a voltage controlled oscillator forming a portion of the FIG. 1 diagram.
Figure 3:
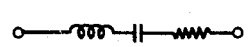
FIG. 3 is an equivalent circuit diagram of a vibrator for use in the FIG. 2 circuit.
Figure 4:
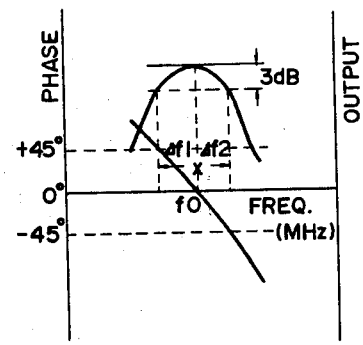
FIG. 4 is a graph showing a characteristic of a vibrator.

Although the above described voltage controlled oscillator 5 is structured as shown in FIG. 2, it is to be noted that a vibrator 15 including LiTaO$_3$ as a base material (hereinafter referred to as a LiTa vibrator) is utilized in place of a conventional quartz vibrator as a vibrator. FIG. 3 shows an equivalent diagram of the LiTa vibrator and FIG. 4 shows an input/output characteristic of the same, wherein the abscissa indicates the frequency and the ordinates indicate the phase and the output. In comparison with a conventional quartz vibrator, the LiTa vibrator has a low quality factor value and has the frequency deviations $\Delta f1$ and $\Delta f2$ up to a 3 dB attenuation point as large as 1 to 2.6 kHz.

Referring to FIG. 2, assuming that the points (a) and (b) of the oscillation loop are opened and the signal ei is entered from the point (b), an operation in such a situation is considered. First the LiTa vibrator 15 comes to show the zero impedance at the resonance frequency and therefore the base of one transistor T25 constituting a differential pair is supplied with the following voltage.

$$\frac{R_B}{R_B + R33} ei$$

Since the base of the other transistor T24 of the differential pair is supplied with the voltage ei directly, the differential pair transistors T24 and T25 amplify the following difference voltage:

$$\left(1 - \frac{R_B}{R_B + R33}\right) ei$$

Figure 5:
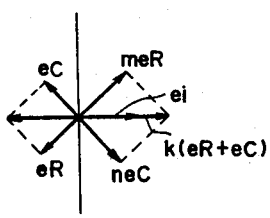
FIG. 5 is a view for explaining the operation of the FIG. 2.

Now assuming that the collector outputs of the differential pair transistors T24 and T25 are e24 and e25, respectively, the phases of the collector outputs e24 and e25 are different by 180°. The outputs e24 and e25 are applied to the emitter follower transistors T3 and T4, respectively; however, since the resistors R12, R13 and R18 have been selected to satisfy the relation of R12+R13=R18, no signal remains at the point (d) and no signal is applied to the transistor T17. The voltage e24 is applied through the emitter follower transistor T3 and through the point (e) to the phase shifting circuit 16 constituted by a resistor $R_A$ and a capacitor $C_A$. Assuming that the signal voltages being applied across the resistor $R_A$ and the capacitor $C_A$ are eR and eC, respectively, the voltages eR and eC have a phase difference of 90° in the case where the impedances of the resistor $R_A$ and the capacitor $C_A$ are equal to each other. The voltages eR and eC are applied to the differential pair transistors T14 and T15; and T16 and T17. The signals meR and neC (m and n are constants) inverted by 180° by means of the differential pair transistors T14 and T15; and T16 and T17 are added at the point (f) to produce k(eR+eC) (k is a constant), which is obtained through the emitter follower transistors T21 and T23 from the point (a). By short-circuiting the points (a) and (b), the above described output is added to the voltage ei at the point (b) to perform the same operation to make oscillation. FIG. 5 shows a vector diagram in such a case.

Figure 6:
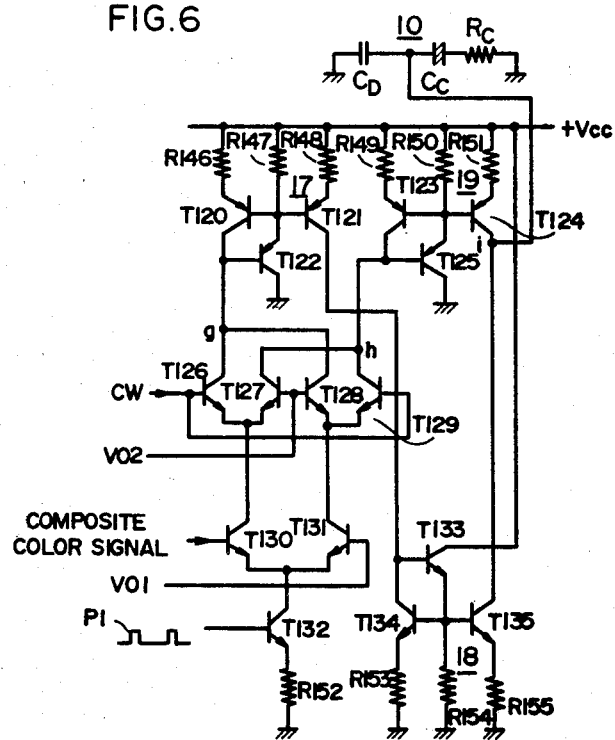
FIG. 6 is a schematic diagram of a phase comparator constituting a portion of the FIG. 1 diagram.

FIG. 6 shows a phase comparator 9 and a burst gate 8. These circuits are formed together as a double balance type differential circuit, in which the base of one transistor T131 of the lower stage differential pair transistors T130 and T131 is biased in a fixed manner by the voltage VO1, while the base of the other transistor T130 is supplied with the composite color signal from the color amplifier 1. The constant current source transistor T132 is supplied with the burst gate pulse at the base thereof, whereby the same is rendered conductive only during the burst gate pulse period and only the color burst is extracted from the above described composite color signal to provide the same at the collectors of the lower stage differential pair transistors T130 and T131, which is supplied to the emitters of the upper stage differential pair transistors T126 and T127; and T128 and T129. The bases of the transistors T127 and T128 out of the upper stage differential pair transistors T126 and T127; and T128 and T129 are supplied with a fixed bias VO2, while the bases of the transistors T126 and T129 are supplied with the color subcarrier wave CW from the above described voltage controlled oscillator 5, whereby phase comparison of the color burst and the color subcarrier wave are made by way of multiplication. As a result, the first output appears at the point (g) where the collectors of the transistors T126 and T128 are commonly connected and the second output appears at the point (h) where the collectors of the transistors T127 and T129 are commonly connected. The first and second outputs are of opposite phases to each other and the first output appears at the point (i) as the collector output of the transistor T135 from the current mirror circuit 18 implemented by the transistors T133, T134 and T135 and the resistors R153, R154 and R155 through the current mirror circuit 17 implemented by the transistors T120, T121 and T122 and the resistors R146, R147 and R148. On the other hand, the second output is obtained at the point (i) as the output of the transistor T124 through the current mirror circuit 19 implemented by the transistors T123, T124 and T125 and the resistors R149, R150 and R151.

Figure 7:
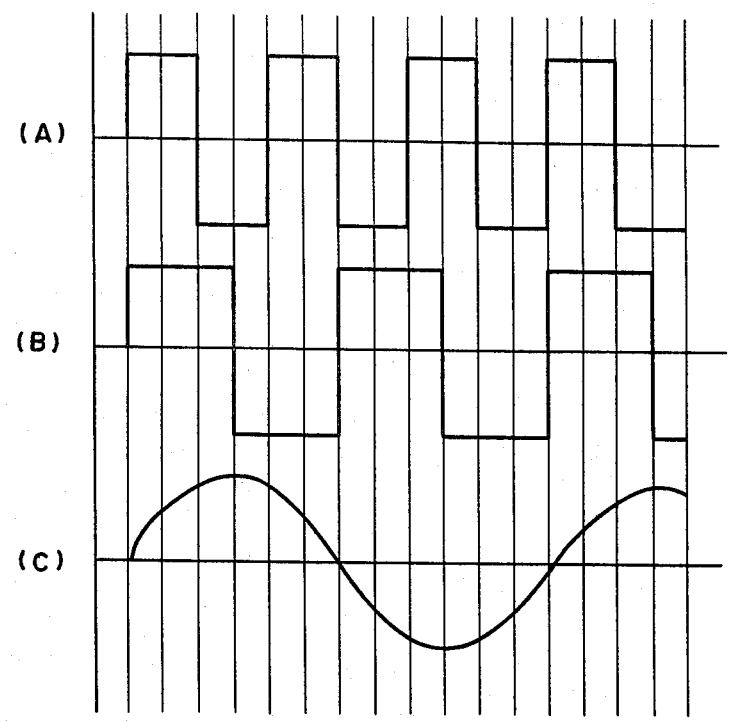

FIG. 7 shows the switching operation of the transistor responsive to the color burst and the color subcarrier wave CW and the output waveform based on the above described switching operation and in particular shows a signal of a beat frequency, i.e. a phase comparison output appearing as (C) in FIG. 7, by taking an example in the case where the color subcarrier wave CW shown as (B) in FIG. 7 as shifted by $-\frac{1}{2}f_H$ with respect to the color burst shown as (A) in FIG. 7. The output signal is supplied from the point (i) (FIG. 6) through a low pass filter 10 formed as a dual time constant circuit (a high frequency filter is formed with the resistor R152 and the capacitor $C_D$ and a low frequency filter is formed with the resistor R152 and the capacitor $C_C$ in FIG. 6) to the above described voltage controlled oscillator 5 as a control voltage.

Figure 8:
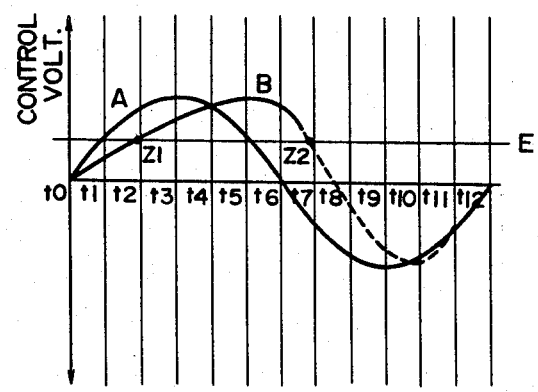

Referring to FIG. 8, the abscissa indicates the time and the ordinate indicates the above described control voltage and the curve A merely shows the output of the above described phase comparator 9 in the case where the phase locked loop is not rendered effective, i.e. in the case where the automatic color synchronization is not rendered effective. Now considering a case where automatic color synchronization is rendered effective, since the control voltage is positive during a period of t0–t6, the oscillation frequency of the voltage controlled oscillator 5 becomes lower and the beat frequency also becomes lower, whereas since the control voltage is negative during a period of t6–t12, the beat frequency becomes higher as shown by the curve B in FIG. 8. The curve B crosses the potential E for making stable oscillation of 3.579545 MHz at two points Z1 and Z2; however, at the point Z1 the operation is in a direction for decreasing the oscillation frequency and hence is in the direction away from the stable point and therefore a beat signal is further continually generated. At the point Z2 the operation is in the direction for increasing the oscillation frequency to be close to the stable point of 3.579545 MHz and therefore the voltage controlled oscillator 5 becomes stabilized when the point Z2 is reached and thereafter no beat signal is generated.

Figure 9:
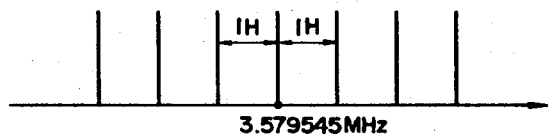
FIGS. 7A–C, 8, 9, 10, 11, 12A and B, 13, 14 and 15 are graphs for explaining the operation of the diagrams shown in FIGS. 1 and 6 and a diagram of FIG. 16 to be described subsequently.
Figure 10:
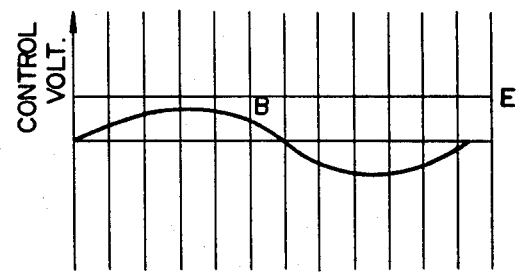
Figure 11:
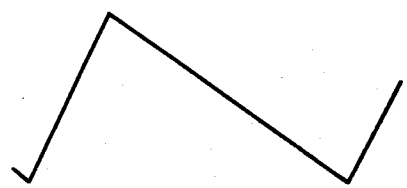
Figure 12:
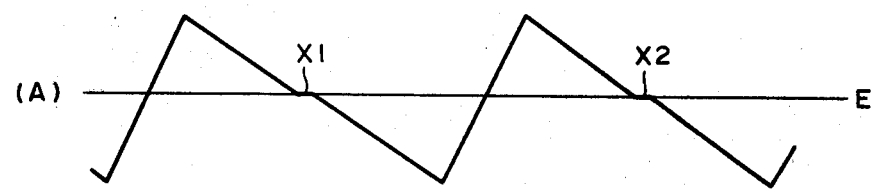
Figure 12:
Figure 13:
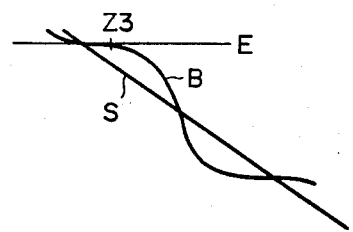

Meanwhile, as described previously, the embodiment employs an LiTa vibrator 15 as a vibrator of the voltage controlled oscillator 5. Employment of such LiTa vibrator brings about an advantage of extreme inexpensiveness of a vibrator as compared with the case where a quartz vibrator is employed and further brings about another merit set forth in the following. More specifically, in the case where the frequency of the color burst on the part of the broadcasting station has deviated from the normal frequency of 3.579545 MHz, it is necessary to make the color subcarrier wave generated by the voltage controlled oscillator 5 consistent with that of the color burst; however, a voltage controlled oscillator employing a LiTa vibrator having a low quality factor can favorably work in such a situation. If the quality factor is high, the gain becomes considerably low at the deviated color burst; however, if the quality factor is low, the decrease of the gain becomes small. The frequency variable range as a function of the control voltage of the voltage controlled oscillator employing the LiTa vibrator is as broad as approximately ±7 kHz due to the small quality factor of the LiTa vibrator 15 and is approximately ten times as compared with the frequency variable range of the conventional voltage controlled oscillator employing a quartz vibrator being approximately ±700 Hz. When the frequency spectrum of the color burst is diagrammatically shown, the frequency distribution appears at 1 H interval with 3.579545 MHz as the center, as shown in FIG. 9. In such frequency distribution, only the frequency of 3.579545 MHz is necessary and, since there are intervals of ±15.75 kHz (±1 H) from 3.579545 MHz to the adjacent frequency component, even in the case of the voltage controlled oscillator employing the LiTa vibrator the color synchronizing circuit will not make malfunction responsive to the adjacent frequency component. However, the frequency variable range of the voltage controlled oscillator employing the LiTa vibrator is approximately ten times, as described previously, as compared with a case where the quartz vibrator is employed and therefore a pull-in range of the phase locked loop employing the voltage controlled oscillator employing the LiTa vibrator is also approximately ten times. In the case of a broad frequency pull-in range, a problem is involved that an anti-noise characteristic on the occasion of a weak electric field intensity is degraded (on the occasion of a weak electric field intensity generally a noise becomes conspicuous and this noise could make the apparatus operable). Therefore, by paying an attention to the fact that the oscillation frequency variable range of the voltage controlled oscillator is proportional to the amplitude of the beat signal being generated at the output of the phase comparator, the embodiment is adapted such that the beat signal is applied to the low pass filter 10 formed as a dual time constant circuit shown in FIG. 6 to full attenuation (say 1/10) whereby a frequency pull-in range is made narrow, thereby to improve an anti-noise characteristic on the occasion of a weak electric field intensity to be commensurate with that in case where a quartz vibrator is employed. Incidentally described, the resistor $R_C$ of the low pass filter 10 is 390 Ω, the capacitor $C_C$ is 4.7 μF, the capacitor $C_D$ is 10,000 pF, and the resistor R152 is 500 Ω. Meanwhile, since the beat signal amplitude was thus decreased, a problem is caused that the phase locked loop does not reach the stabilized potential E of 3.579545 MHz by the beat signal as shown in FIG. 10 and accordingly the phase locked loop is not locked to 3.579545 MHz; however in order to solve such a problem, the embodiment shown employs a sweeper circuit 11 so that the above described beat signal is superimposed on the sweep voltage, whereby the beat signal is made to reach the stable potential of 3.579545 MHz, thereby to lock the phase locked loop. On that occasion, the sweep voltage waveform is selected to be not a mere sawtooth waveform but to be a stepwise waveform to be described subsequently. No problem is involved even with a sawtooth waveform, if the phase locked loop is locked by applying a continuous waveform as a reference signal; however, in the case where automatic color synchronization is to be achieved by using such an intermittent signal as a color burst as a reference signal, automatic color synchronization is not locked even when the sweep voltage waveform is superimposed. The above described stepwise waveform is aimed to eliminate such inconvenience. For example, considering a case of a phase locked loop in which an intermittent signal as shown as (B) in FIG. 12 is used as a reference signal, when a mere sawtooth waveform voltage is used as a sweep voltage being superimposed as shown in FIG. 11, a locking operation is about to be made to the stable potential E at the point X1 shown in FIG. 12 but, since the information as a reference signal is intermittent, the phase detected output of the phase locked loop is not enough and a lock operation is not performed and thus even at the following point X2 of the fall of the sawtooth waveform likewise a lock operation is not performed. Meanwhile, a lock operation does not take place at the rise of the sawtooth waveform, inasmuch as the same is steep, as is needless to say. In the case of a phase locked loop in which not an intermittent signal but a continuous signal is employed as a reference signal, the detected output and thus the control output is enough but even in such a case superimposition of a mere sawtooth waveform voltage still involves a problem that a lock operation is still difficult. The reason is that even when the control voltage B reaches a stable potential E at the point Z3 as shown in FIG. 13 there is a high possibility that a lock operation is not performed since the sweep voltage S has decreased.

Figure 14:
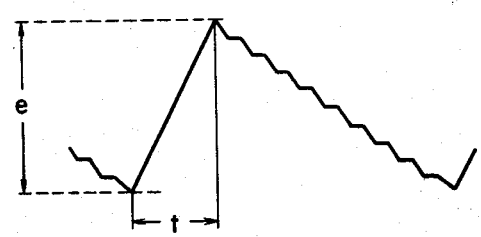
Figure 15:
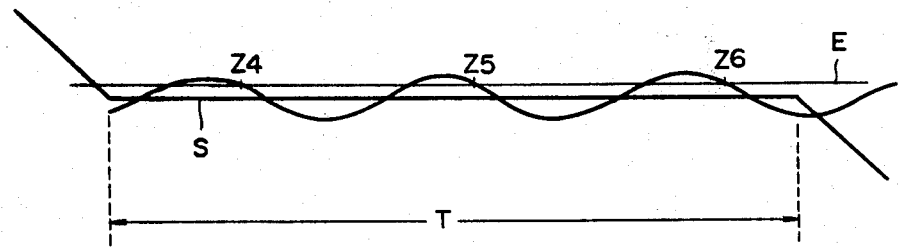

By contrast, since the embodiment shown employs a sweep voltage waveform of a stepwise waveform as shown in FIG. 14 (since only the fall is used in the embodiment a stepwise waveform at the fall portion is sufficient), the sweep voltage S does not decrease at every T period as shown in FIG. 15 and therefore at the T period close to the stable potential E the comparison output (the beat signal between the color burst and the color subcarrier wave) from the phase comparator 9 crosses the stable potential E several times as shown in FIG. 15, whereby changes of being locked are met at the points Z4, Z5 and Z6. In addition, since the above described T period is selected to be long (as long as eight times the horizontal period) in actuality, the color burst of the intermittent signal is utilized for a plurality of lines (8 H) in the T period and a control signal of an ample one is obtained irrespective of the time constant of the low pass filter 10, with the result that a lock operation to the stable potential E is assured.

Figure 16:
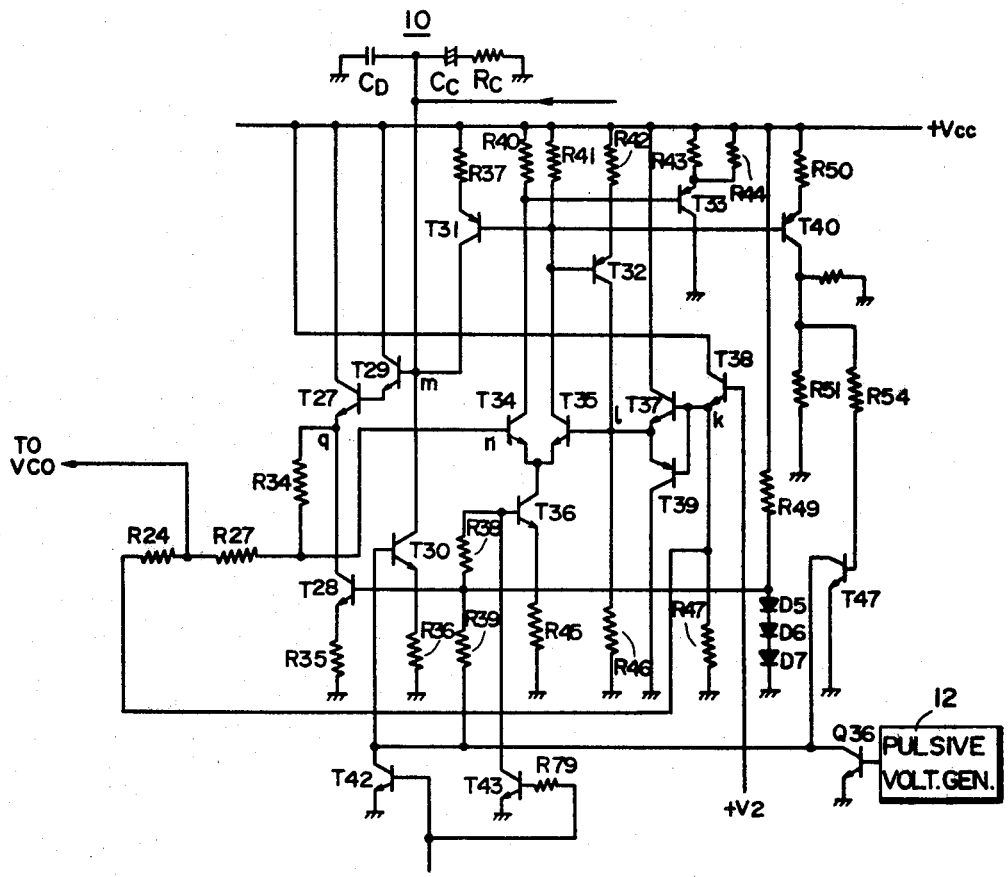
FIG. 16 is a schematic diagram showing a specific example of a sweeper circuit constituting a portion of the FIG. 1 diagram.

Now the sweeper circuit 11 will be described with reference to the embodiment shown in FIG. 16. Referring to FIG. 16, in the case where the capacitor $C_C$ of the low pass filter 10 has not been charged, assuming that the potential at the point (k) is E1, the potential at the point (l) becomes E1−Vf, where Vf is the base/emitter voltage on the occasion of conduction of the transistor. Since the capacitor $C_C$ has not been charged, the potential at the point (m) is 0 and the transistors T27 and T29 are placed in a cutoff state. The current flows through the path of the point (k)→the resistor R24→the resistor R27→the resistor R34→the transistor T28→the resistor R35→the ground and the current is determined by the diodes D5, D6 and D7, the transistor T28 and the resistor R35 and is given as i=2Vf/R35. Therefore, the potential at the point (n) is expressed by the following equation.

$$E2 = E1 - i(R24 + R27)$$
$$= E1 - \frac{2Vf}{R35}(R24 + R27)$$

Therefore, the circuit is designed so that E2<E1−Vf may be in advance met. Since E2<E1−Vf, the differential pair transistors T34 and T35 are brought in such a state in which the transistor T34 is turned off and the transistor T35 is turned on. When the transistor T35 is turned on, a current flows through the resistor R41, to cause a voltage drop thereacross, whereby the transistors T31, T32 and T40 are turned on. When the transistor T40 is turned on, a current flows through the transistor T40 and a base current is supplied to the transistor T47, whereby the transistor T47 is placed in an on state and the collector potential of the transistor T47 becomes 0 V, by neglecting the resistance between the collector and the emitter thereof. Therefore, no base current flows to the transistor T30 and the transistor T30 is cut off. Since the transistor T31 has been placed in an on state as described previously, a charging current flows to the capacitor $C_C$ through the point (m). Since the transistor T30 has been placed in a cutoff state as described previously, the above described current does not flow through the transistor T30. As the capacitor $C_C$ is charged, the potential at the point (m) increases, whereby the potential at the point (n) accordingly increases. Since the transistor T32 as well as the above described transistors T31 and T40 are in an on state, a potential difference occurring across the resistor R46 increases and the potential at the point (l) also increases; however, the voltage E1 is exceeded, the transistor T37 in turned off and instead and instead the transistor T39 is turned on and accordingly the potential at the point (l) is clamped to the value of E1+Vf. When the potential at the point (n) becomes higher than the potential at the point (l), the differential pair transistors T34 and T35 are operated such that the transistor T34 is turned on and the transistor T35 is turned off. When the transistor T35 is turned off, the transistors T31, T32 and T40 are turned off. When the transistor T31 is turned off, a charging current comes not to flow to the capacitor $C_C$ and the capacitor $C_C$ is not charged, with the result that the capacitor $C_C$ starts discharging. Since the transistor T40 is turned off, the transistor T47 comes not to be supplied with a base current, whereby the transistor T47 is turned off. Therefore, a bias is applied to the base of the transistor T30 and the electric charge in the capacitor $C_C$ is discharged through the path of the point (m)→the collector of the transistor T30→the emitter of the transistor T30→the resistor R36. Since the transistor T32 is turned off, the potential at the point (l) decreases up to E1−Vf. When the differential pair transistor T34 is turned on, the transistor T33 is turned on and a current flows from the voltage source +Vcc through the resistors R43 and R44 and the transistor T33 to the ground. This is aimed to cuase a current of the same amount to flow on the occasion of charging of the capacitor $C_C$ as that of the current that flowed through the route of the voltage source +Vcc→the resistor R37→the transistor T31→the point (m)→the capacitor $C_C$, thereby to prevent a ripple from being superimposed. When the capacitor $C_C$ is discharged and the potential at the point (n) becomes lower than the potential at the point (l), the above described charging and discharging operations are repeated.

As described previously, in the FIG. 16 embodiment the potential at the point (l) changes by ±Vf with the potential E1 as the center and accordingly the potential at the point (n) also changes and therefore the potential at the point (q) changes by ±Vf with the potential E1 as the center. When the potential at the point (l) changes as E1±Vf, the potential E3 at the point (q) changes as follows:

$$E3 = (E1 \pm Vf - E1) \times \frac{R24 + R27 + R34}{R24 + R27}$$
$$= \pm \frac{R24 + R27 + R34}{R24 + R27} Vf$$

Assuming that the maximum amplitude of the sweep voltage waveform is e (see FIG. 14), then the following equation is obtained.

$$e = R24 + R27 + R34/R24 + R27(2Vf)$$

Insofar as the foregoing description is concerned, the sweep voltage is a mere sawtooth waveform as shown in FIG. 11; however, the base of the transistor Q36 is supplied with a pulse of the frequency of $f_H/16$ from the pulse supply means 12 (FIG. 1) during the fall of the above described sweep waveform and therefore the transistor Q36 is turned on/off, whereby the transistor T30 is turned off/on and the potential at the point (m) and the potential at the point (q) become a stepwise waveform during the fall period. More specifically, during the low level of the pulse from the pulse supply means 12 the transistor Q36 is turned off and therefore the transistor T30 is placed in an on state (because the base bias being applied through the path of the voltage source +Vcc→the resistor R49→the resistor R39→the transistor T30 is not rendered ineffective) and the electric charge in the capacitor $C_C$ is discharged through the collector and emitter of the transistor T30 and the resistor R36, whereby the potentials at the points (m) and (q) decrease. During the high level of the above described pulse the transistor Q36 is turned on and the base bias of the transistor T30 is rendered ineffective and is brought to 0 V, whereby a discharging operation of the capacitor $C_C$ through the transistor T30 is brought to a stop, stopping a decrease of the potentials at the points (m) and (q).

In the foregoing the case where the fall of a sawtooth waveform voltage is stepwise was described. However, a modification of the same concept would be obvious to those skilled in the art, in which the rise of a sawtooth waveform is stepwise.

Meanwhile, since the FIG. 16 embodiment is structured such that the upper limit and the lower limit of the sweep voltage waveform are dependent on the voltage Vf between the base and the emitter of the transistor in coduction as described previously, an advantage is brought about that a decrease of the quality factor value of the voltage controlled oscillator 5 on the occasion of an increase of the temperature is compensated. For example, referring to FIG. 2, the resistor R33 is coupled in series with the externally connected LiTa vibrator; however, the quality factor of the resonance circuit of the voltage controlled oscillator becomes lower as the temperature increases due to the temperature dependency of the resistor R33 (when the temperature increases by 1° C. the resistance value increases 0.2%), with the result that the original condition is not met that the frequency variable range $\Delta f$ of the voltage controlled oscillator is made $\Delta f < \pm fH$ with respect to the repetition frequency (and thus the horizontal frequency) $f_H$ of the color burst, whereby it is unavoidable that the phase locked loop is liable to cause malfunction at the spectrum (see FIG. 9) adjacent to 3.579545 MHz and at the same time an anti-noise characteristic on the occasion of a weak electric field intensity is degraded.

However, since the sweep voltage is dependent on Vf and Vf decreases as a temperature increases, the sweep voltage decreases as a temperature increases and accordingly a control voltage being applied to the voltage controlled oscillator serves to compensate for a decrease of the quality factor of the above described resonance circuit, thereby to eliminate the above described problem.

The FIG. 16 embodiment is structured such that the transistor T30 is cutoff on the occasion of charging the capacitor $C_C$ through the transistor T31 in conduction, thereby to release the discharging impedance device, whereas the transistor T31 is cutoff on the occasion of discharging through the transistor T30 in conduction, thereby to release the charging impedance device. Therefore, an advantage is brought about that no more current necessary for forming a sweep voltage waveform is consumed. Furthermore, another advantage is brought about that diversification of waveforms on the occasion of the fall of the sweep voltage waveform decreases by virtue of such structure (because the charging impedance device has been released) and the time period t not contributing to the pull-in operation of color synchronization (see FIG. 14) is shortened. Referring to FIG. 16, the bases of the transistors T30 and T36 are further connected to the collectors of the transistors T42 and T43; however, since these transistors T42 and T43 are on/off controlled responsive to the output of the color killer circuit 14, it follows that the sweeper circuit 11 is controllably enabled or disabled responsive to the output of the color killer circuit 14 eventually.

The color killer circuit 14 produces a color killer signal responsive to the output during the color burst period of the R-Y demodulator 2 and the B-Y demodulator 4 as shown in FIG. 1; however, the output of the G-Y demodulator 3 may be employed in place of the output of the R-Y demodulator 2. The reason is that the output of the R-Y demodulator 2 and the output of the G-Y demodulator 3 may be deemed as substantially the same during the color burst period. More specifically, the demodulated output of the color burst from the R-Y demodulator 2 is zero while the demodulated output from the G-Y demodulator 3 is that which is obtained as a result of matrixing the outputs of the B-Y demodulator and the R-Y demodulator; however, originally the output of the G-Y demodulator has been set to approximately 3/10 of the demodulated outputs from the R-Y demodulator and the B-Y demodulator and therefore the color burst demodulated output (the color burst output from the R-Y demodulator is zero as described previously) being applied from the B-Y demodulator to the G-Y demodulator is decreased to 3/10 and therefore the color burst demodulated output of the G-Y demodulator can be deemed as approximately zero.

Figure 17:
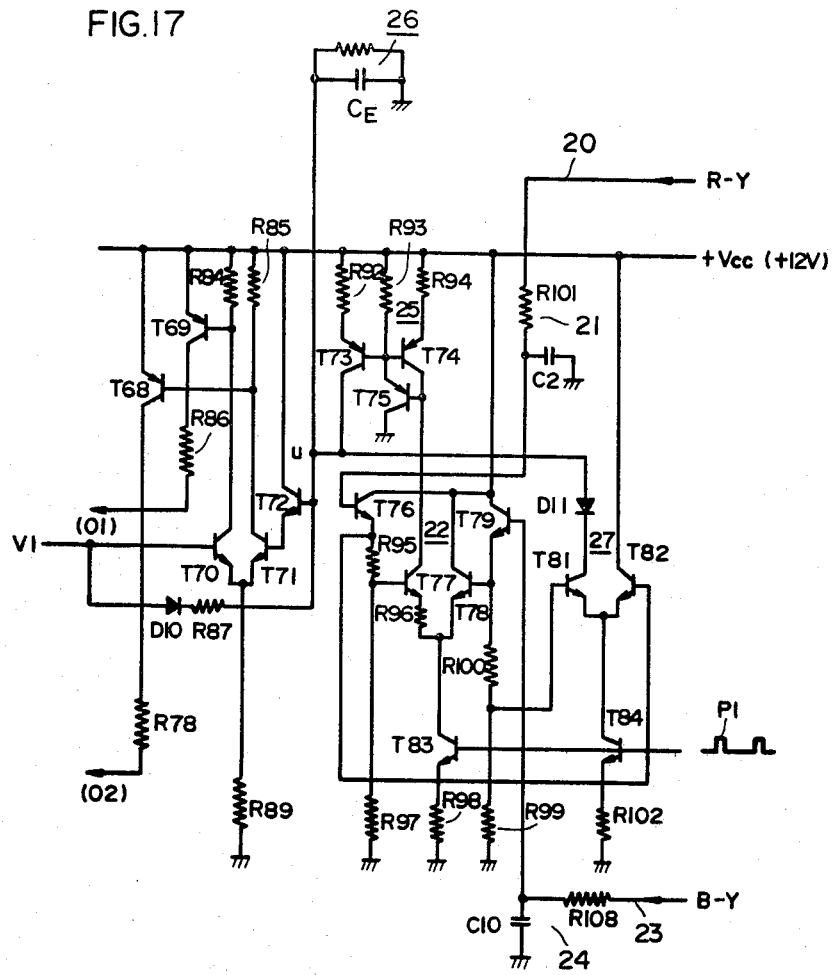
FIG. 17 is a schematic diagram of a color killer circuit forming a portion of the FIG. 1 diagram.

Referring to the color killer circuit shown in FIG. 17, the output of the R-Y demodulator is applied from the line 20 to the base of the emitter follower transistor T76 through the low pass filter 21 including the resistor R101 and the capacitor C2 and is applied to the base of the transistor T77 forming the differential pair for the comparator 22 through the resistor R95 at the emitter side of the transistor T76. On the other hand, the output of the B-Y demodulator is applied from the line 23 to the base of the emitter follower transistor T79 through the low pass filter 24 including the resistor R108 and the capacitor C10 and is directly applied to the base of the other transistor T78 of the above described comparator 22 from the emitter of the transistor T79. The R-Y channel and the B-Y channel have been set in the same conditions, for example, the direct current biases from the demodulator applied to the lines 20 and 23 are the same and the resistors R101 and R108 and the capacitors C2 and C10 have been selected to be the same values, respectively, and so on; however the output of the R-Y demodulator is applied through the resistor R95 to the comparator 22 so that the output being applied is made small by a voltage drop across the resistor R95 as compared with the output of the B-Y demodulator. The said voltage drop is approximately 0.3 V. The output of the above described comparator 22 is applied to the integrating circuit 26 through the current mirror circuit 25 formed with the transistors T73, T74 and T75 and the resistors R92, R93 and R94 and is smoothed by the integrating circuit 26. The thus smoothed output is applied to the differential pair transistors T70 and T71 through the emitter follower transistor T72 (as regards the supplied bias thereto, the fixed potential V1 is directly applied to the base of the transistor T70 and is applied through the diode D10, the resistor R87, the base/emitter of the transistor T72 to the base of the transistor T71) and is further applied from the collector of the emitter grounded transistor T69 to the color amplifier 1 shown in FIG. 1 and on the other hand is supplied from the collector of the emitter grounded transistor T68 to the bases of the above described transistors T42 and T43 of the sweeper circuit 11. The above described comparator 22 is operable only during the period of the burst gate pulse P1 applied to the base of the constant current source transistor T83 and is otherwise inoperable. Therefore, the output portion other than the color burst period out of the output from the R-Y demodulator and the output from the B-Y demodulator obtained from the lines 20 and 23 does not affect at all the color killer operation.

Referring to FIG. 17, considering a case in the absence of the color burst such as on the occasion of reception of the monochrome broadcasting, the base potentials of the differential pair transistors T77 and T78 of the comparator 22 have been selected in advance such that the base potential of the transistor T78 is higher and therefore the transistor T77 has been turned off and the transistor T78 has been turned on. Therefore, no current flows through the current mirror circuit 25 and the capacitor $C_E$ of the integrating circuit 26 has not been charged and the potential at the point (u) does not increase. Therefore, the differential pair transistor T70 and T71 at the output side are operated such that the transistor T70 is turned on and the transistor T71 is turned off. The transistor T69 is turned on responsive to the on state of the above described transistor T70 and the high level voltage is developed at the first output point O1 for stopping the color amplifier 1. However, the signal at the first output point O1 is applied through the color ineffective rendering means 13 and therefore does not stop the color amplifier 1 at least during the color burst period. On the other hand, the transistor T68 is turned off resposive to the off state of the transistor T71 and no voltage is generated at the second output point O2 for stopping the sweeper circuit 11 and accordingly the sweeper circuit 11 is placed in an enabled state.

Figure 18:
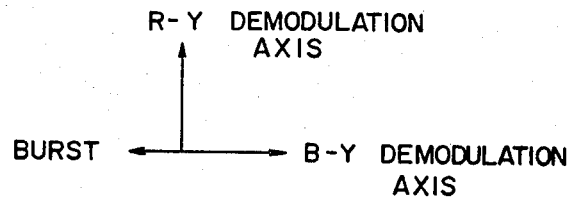
FIGS. 18, 19 and 20 are graphs for explaining the operation of the FIG. 17 diagram.

Now consider a case in the presence of the color burst and in a proper reception state. Since the color burst signal has a phase different by 180° from the B-Y demodulation axis as shown in FIG. 18, the color burst demodulated output of the B-Y demodulator 4 becomes a negative voltage in the case of the presence of the color burst and the potential at the line 23 decreases. Accordingly, when the base potential of the transistor T78 decreases more than a predetermined value, the states of the transistors T77 and T78 are reversed such that the transistor T77 is turned on and the transistor T78 is turned off. When the transistor T77 is turned on, a current flows through the current mirror circuit 25 and a current for charging the capacitor $C_E$ flows through the point (u) and therefore the potential at the point (u) increases. The base potential of the transistor T71 also increases as the potential at the point (u) increases and the differential pair transistor T70 is turned off while the transistor T71 is turned on. The transistor T69 is turned off responsive to turning off of the transistor T70 and no voltage for stopping the operation of the color amplifier 1 is generated at the first output point O1. Therefore, the color amplifier 1 normally operates. On the other hand, the transistor T68 is turned on responsive to turning on of the transistor T71 and the high level is generated at the second output point O2. Since the high level voltage is applied to the base of the transistors T42 and T43 of the sweeper circuit 11, the transistors T42 and T43 are turned on and the base potentials of the transistors T30 and T36 are clamped to the ground potential, whereby the transistors T30 and T36 are fixed to off and the sweep operation of the sweeper circuit 11 is stopped.

Referring to FIG. 17, an auxiliary circuit 27 is provided for generating a control voltage in the direction for stopping generation of color (because even if a color is generated the same becomes mostly a color noise) when the color burst demodulated output is provided in the positive direction from the B-Y demodulator or the color burst demodulated output is provided in the negative direction from the R-Y demodulator (and accordingly when color synchronization has been disturbed). The auxiliary circuit 27 comprises the differential pair transistors T81 and T82, a constant current source transistor T84 and a resistor R102 and a reverse current preventing diode D11. The R-Y demodulated output and the B-Y demodulated output being applied to the auxiliary circuit 27 are applied in a relation of the level opposite to those applied to the above described comparator 22. More specifically, the output from the R-Y demodulator is supplied from the emitter of the emitter follower transistor T76 directly to the base of the transistor T82, while the output from the B-Y demodulator is supplied from the emitter of the emitter follower transistor T79 through the resistor R100 of the voltage drop of 0.3 V to the base of the transistor T81 and therefore are in the relation opposite to the output of the demodulator being applied to the comparator 22. The base of the constant current source transistor T84 is supplied with a burst gate pulse commonly to the constant current source transistor T83 for the comparator 22 and accordingly the auxiliary circuit 27 also operates only during the color burst period.

Since the base potential of the transistor T82 has been selected to be higher than the base potential of the transistor T81, the transistor T82 is turned on and the transistor T81 is turned off in the absence of the color burst and in the case where the color burst demodulated output in the positive direction is not obtained from the B-Y demodulator even in the presence of the color burst (in the case where the color burst and the B-Y demodulating axis are in the relation shown in FIG. 3), no influence is exerted upon the potential at the point (u). However, on the occasion of reception of the color broadcasting of a weak electric field intensity, for example, the phase of the color burst is liable to change at random. In the case of such disturbed color burst, it could happen that the positive color burst demodulated output is obtained from the B-Y demodulator 4 or the negative color burst demodulated output is obtained from the R-Y demodulator 2. In such a case the transistor T77 of the comparator 22 is turned off and the capacitor $C_E$ will not be charged; however, in the case where channel selection is made from a channel of a normal electric field intensity to a channel of a weak electric field intensity, an electric charge stored in the capacitor $C_E$ on the occasion of normal reception remains therein for the time being and during that time period a color noise is caused on the screen. However, in such a case by virtue of the operation of the above described auxiliary circuit 27 the electric charge in the capacitor $C_E$ is instantaneously discharged and therefore the color amplifier 1 is brought to a stop and a color noise on the screen immediately disappears. More specifically, the transistor T81 of the auxiliary circuit 27 is turned on and the electric charge in the capacitor $C_E$ is instantaneously discharged through the path of the capacitor $C_E \to$ the diode D11 $\to$ the transistor T81 $\to$ the constant current source transistor T84 and the resistor R102 $\to$ the ground. The above described auxiliary circuit 27 operates to erase the color even in the case where the color subcarrier wave generated by the voltage controlled oscillator 5 has deviated by say $\pm\frac{1}{2} f_H$ or by $\pm\frac{1}{4} f_H$ from the normal 3.579545 MHz and to enable the sweeper circuit 11. For example, when the color subcarrier wave deviates by $\pm\frac{1}{2} f_H = \pm 7.875$ kHz with respect to 3.579545 MHz, the color burst demodulated output from the B-Y demodulator 4 becomes of an inverted polarity at the 1 H (1 line) interval as shown in FIG. 19.

Figure 19:
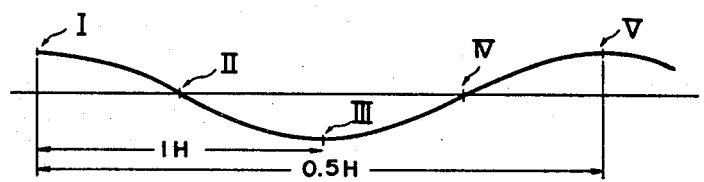
Figure 20:
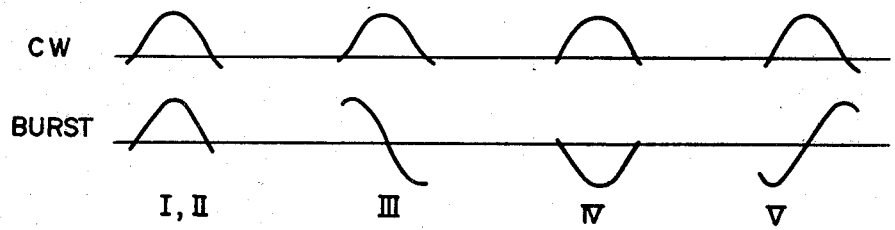

Meanwhile, a phase relation of the color subcarrier wave (CW) and the color burst at I to V in FIG. 19 is shown in FIG. 20. In the case where the B-Y color burst demodulated output of the reversed polarity at the 1 H interval as shown in FIG. 19 is applied to the color killer circuit shown in FIG. 17. First at the portion of III in FIG. 19 the transistor T77 is turned on in the comparator 22 and a charging current flows into the capacitor C4, whereby the potential at the point (u) increases. Now at the portion V (the same applies to the portion I) the transistor T77 is turned off in the comparator 22 and the capacitor $C_E$ is not charged. On the other hand, in the auxiliary circuit 27 the transistor T81 is turned on and the electric charge of the capacitor $C_E$ is discharged through the diode D11 and the transistor T81. Thus in a state in which the color subcarrier wave has deviated by $\pm\frac{1}{2} f_H$ the charging and discharging operations of the capacitor $C_E$ are repeated at each 1 H and the potential at the point (u) is limited to the low level and therefore the high level voltage is generated at the first output point O1 and the color amplifier 1 is brought to a stop during the scanning period (although the same is not stopped during at least the color burst period due to the color ineffective rendering means 13), whereby a color noise does not appear on the screen and no high level voltage is generated at the second output point O2, whereby the sweep circuit 11 continues a sweep operation.

Thus the phase locked loop for color synchronizing is prevented from being locked. Meanwhile, although in the foregoing description a case where deviation by $\pm\frac{1}{2} f_H$ has occurred was described, even in the case where deviation by $\pm\frac{1}{4} f_H$ occurred the color burst demodulated output from the B-Y demodulator 4 repeats at 1 H interval a change of $+ \to 0 \to - \to 0 \to +$ and likewise the color synchronizing phase locked loop is prevented from being locked and hence a color noise is prevented from appearing on the screen. Furthermore, substantially the same operation is performed not only in the case where deviation occurs accurately by $\pm\frac{1}{2} f_H$ and $\pm\frac{1}{4} fH$ but also in the case where deviation occurs in the vicinity of these values. In the case where the frequency and the phase of the color subcarrier wave generated by the voltage controlled oscillator 5 deviates to some extent as described previously, the transistor T36 is maintained in an off state and the sweeper circuit 11 is not fixed in a stopped state by means of the color killer circuit 14 and therefore the sweeper circuit 11 performs an operation described previously. On the other hand, in the case where the frequency and the phase of the color subcarrier wave are in a predetermined range, the transistors T42 and T43 are turned on and the sweeper circuit 11 is fixed to a stopped state, whereby the color synchronizing phase locked loop is locked.

Figure 21:
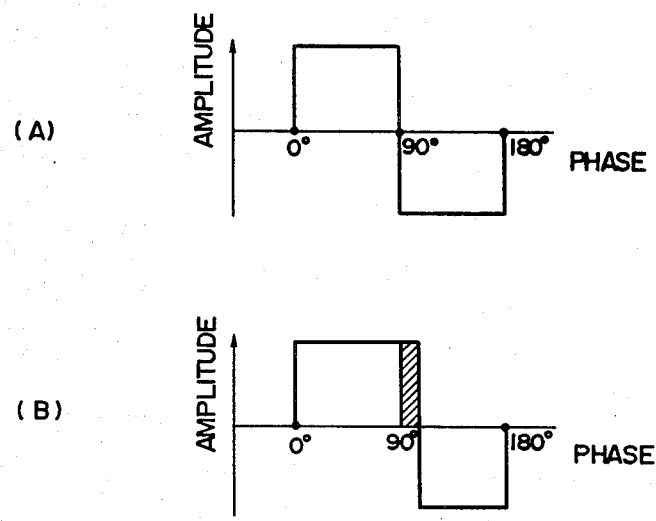
FIGS. 21A and B are graphs for explaining an operation of the FIG. 1 diagram.

In the locked state the output of the phase comparator 9 becomes zero in terms of the direct current. This is shown in a current waveform as (A) in FIG. 21. After the color synchronizing phase locked loop is once locked, the frequency of a beat signal (a beat of the color subcarrier wave and the color burst) of the output from the phase comparator 9 is as low as being deemed as substantially a direct current and therefore the time constant of the low pass filter 10 becomes large and the input impedances of the emitter follower transistors T27 and T29 (FIG. 16) are also large and the gain of the phase comparator 9 becomes large. In such a locked state, a current flows by an amount (a hatched portion) associated with deviation of the phase and the frequency as shown as (B) in FIG. 21 and the voltage generated by the current is applied to the voltage controlled oscillator 5. Referring to FIG. 21, the abscissa indicates the deviation amount of the color subcarrier wave and the ordinate indicates the output of the phase detector. As shown in the embodiment circuit shown in FIG. 16, the emitter follower transistors T27 and T29 (which may be an emitter grounded type amplifier in place of an emitter follower) are connected as a load of the phase comparator 9, so that the load may be of the high impedance. Therefore, an unnecessary discharge of the low pass filter 10 is restricted as much as possible and a jitter in the color synchronizing phase locked loop system can be suitably corrected. More specifically, in a phase locked loop system receiving the color burst the phase detected output is intermittent as described previously and is not continuous. Therefore, a discharge of the integrating circuit of the low pass filter 10 causes a large jitter. In the case of a sweep voltage superimposing type the variable range of the voltage controlled oscillator 5 is large as compared with a pull-in range and therefore a jitter due to the above described discharge becomes much larger. However, by employing the emitter followers T27 and T29 (particularly of a non-bias type) or a non-bias emitter grounded type amplifier as described previously, the above described jitter is drastically mitigated. In addition, since an electric charge in the capacitor is very little discharged by the emitter followers T27 and T29, it follows that a current for charging an electric charge which was slightly discharged through the emitter followers T27 and T29 is supplied from the phase comparator 9 and, since this current flows as a function of the phase difference and the frequency difference of the color burst and the color subcarrier wave, a current flows which is commensurate with the deviation of 100 Hz in terms of the frequency and 0.05° in terms of the phase. By contrast, in a conventional circuit, since such high impedance load was not employed, it was necessary to flow a much more current for charging a discharged electric charge and it was necessary to flow a current commensurate with the deviation corresponding to 100 Hz in terms of the frequency and 5° in terms of the phase. Accordingly, it follows that according to the inventive circuit allowance of deviation of the color subcarrier wave is as large as 100 times as compared with a conventional one.

Figure 22A:
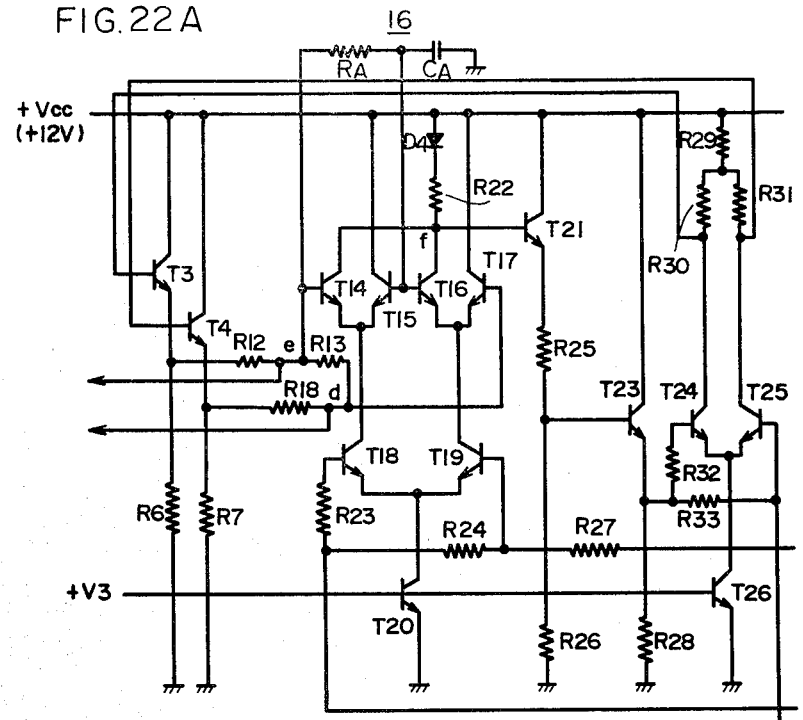
FIGS. 22 and 22A–C are schematic diagrams showing at the same time the diagrams shown in FIGS. 2, 6, 16 and 17.
Figure 22B:
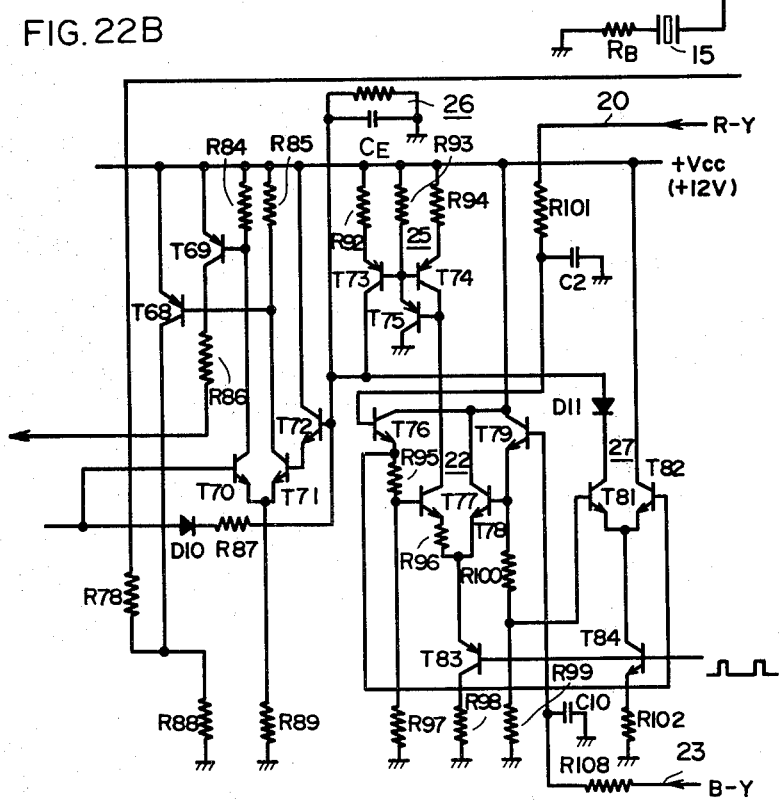
Figure 22C:
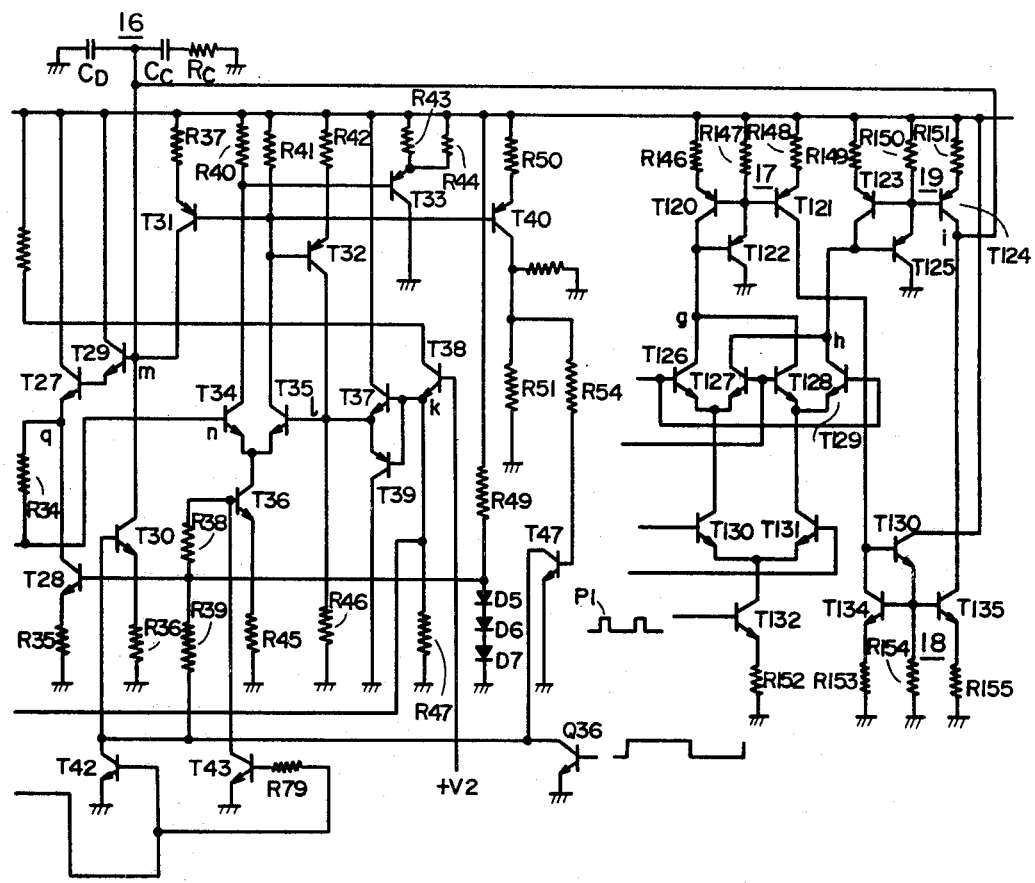
Figure 22:
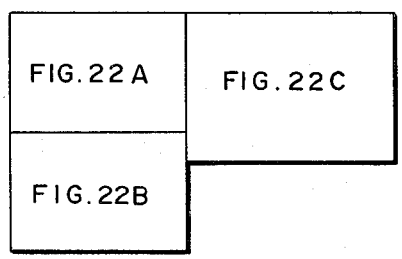

FIG. 22 shows all the diagrams of the circuits in FIGS. 2, 6, 16 and 17 and also a connection relation of these.

Figure 23:
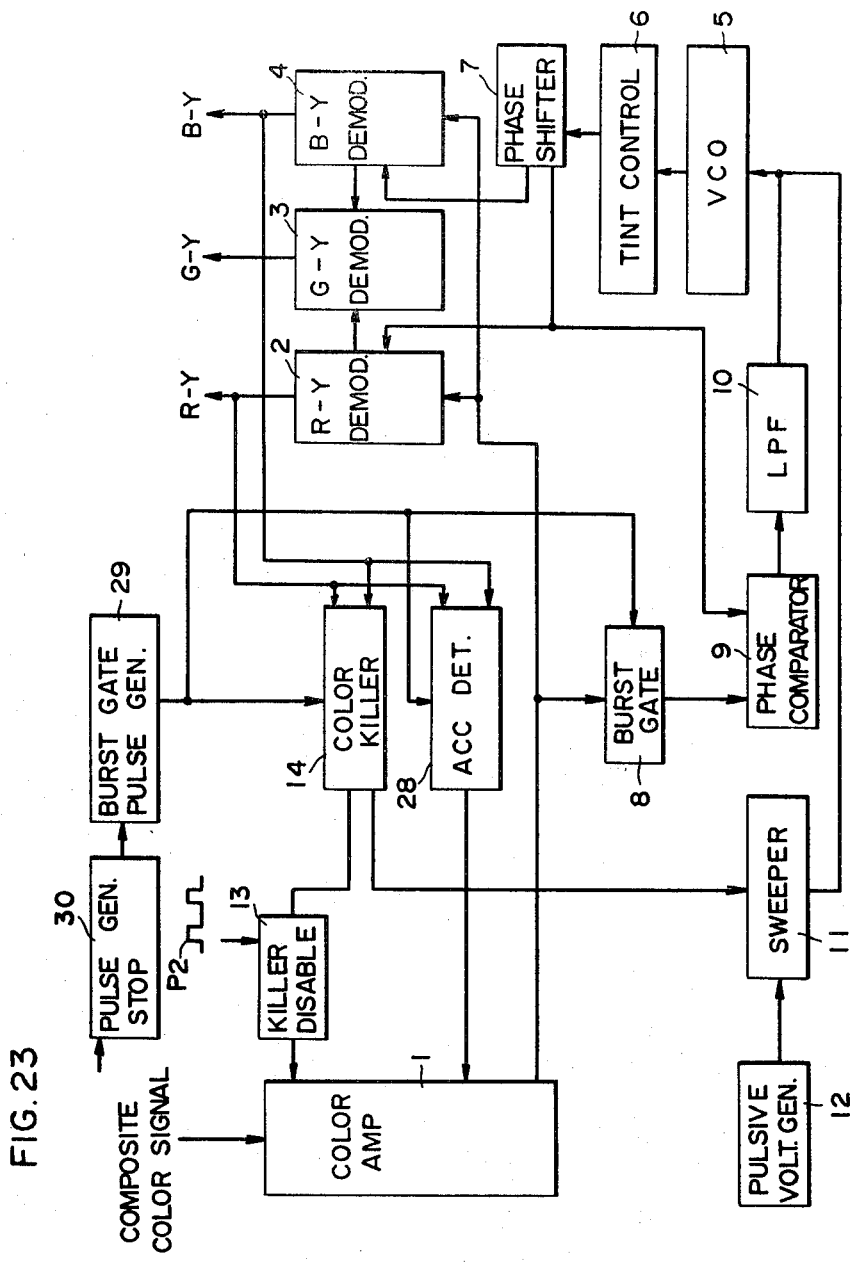
FIG. 23 is a block diagram of another embodiment of the present invention.

Now, as regards the sweep voltage by the sweeper circuit 11, only a fall is utilized and a rise is not utilized and therefore during a rise period not contributing to the color synchronizing operation (and accordingly during a rise period of the sweep voltage waveform) a color synchronizing phase locked loop, a color killer circuit and further an ACC detecting circuit are operated and therefore there is a fear that a smoothing or integrating capacitor attached to these circuits are set in an abnormal state. In the case where the following operation is entered in such state a problem is involved that the color synchronizing operation is delayed. Therefore, FIG. 23 shows a block diagram of a circuit for stopping the operation of the above described respective circuits only during the rise period of the above described sweep voltage waveform. Referring to FIG. 23, the same portions as those of FIG. 1 have been denoted by the same reference character. In addition, the reference numeral 28 denotes an ACC detecting circuit for receiving the demodulated outputs from the R-Y demodulator 2 and B-Y demodulator 4 for generating an ACC signal and the output therefrom is applied to the color amplifier 1 to automatically control the gain of the color amplifier 1. The phase comparator 9 supplied with the reference signal from the burst gate 8 for extracting the color burst from the composite color signal and the above described ACC detecting circuit 28 and the color killer circuit 14 are all operable only during the color burst period responsive to the burst gate pulse; however, a burst gate plate is obtained from the burst gate pulse generator 29. Therefore, the circuit is structured such that the pulse generating operation of the above described burst gate pulse generator 29 is controlled by the means 30 for stopping during the rise period t (FIG. 14) of the sweep voltage waveform so that the burst gate pulse may not be supplied to the burst gate 8, the ACC detecting circuit 28 and the color killer circuit 14 during the above described blanking period. Meanwhile, stopping of the pulse generating operation of the burst gate pulse generator 29 by the above described means 30 may be specifically implemented such that a switch is provided at the output end of the burst gate pulse generator 29 and the switch is turned off during the above described blanking period.

As described in the foregoing, according to the present invention the frequency variable range $\Delta f$ of the voltage controlled oscillator in the phase locked loop type color synchronizing circuit receiving a color burst was selected to be $\Delta f < \pm f_H$ with respect to the repetition frequency $f_H$ of the color burst and therefore advantages are brought about that frequency deviation of the color burst is properly attended to while it is made possible to employ an inexpensive vibrator. Furthermore, since means is provided for making narrow the pull-in range, an anti-noise characteristic is improved. Furthermore, since a sweep voltage is superimposed on the phase detected output, color synchronization is easy of being locked and even in the case of a phase locked loop receiving an intermittent signal such as a color burst a phase locked loop is assuredly locked. Thus, the present invention is very useful.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color synchronizing circuit included in a color process circuit for processing a composite color signal including a color signal and a color burst, an including phase locked loop means having a given pull-in range, said phase locked loop means including
voltage controlled oscillator means responsive to a given control voltage for generating a color subcarrier signal, said voltage controlled oscillator means being structured such that a frequency variable range ($\Delta f$) is in a predetermined relation ($\Delta f < \pm f_H$) with respect to a repetition frequency ($f_H$) of said color burst,
phase comparator means responsive to an intermittent color burst and the output of said voltage controlled oscillator means for comparing the phases thereof, and
control voltage generating means responsive to the output of said phase comparator means for providing said control voltage of said voltage controlled oscillator means, said color synchronizing circuit comprising
pull-in range defining means provided in association with said phase locked loop means for defining said pull-in range of said phase locked loop means in a predetermined range, and
control voltage changing means provided in association with said phase locked loop means for forcedly changing said control voltage,
said control voltage changing means comprising
sawtooth waveform voltage generating means for generating a sawtooth waveform voltage and
means for providing said sawtooth waveform voltage from said sawtooth waveform voltage generating means to said voltage controlled oscillator means in superimposition on said control voltage.

2. A color synchronizing circuit in accordance with claim 1, wherein
said sawtooth waveform voltage generating means comprises stepwise changing means for changing one of said rise and said fall in a stepwise manner.

3. A color synchronizing circuit in accordance with claim 1, wherein
said stepwise changing means comprises means for changing one of said rise and said fall in a stepwise manner for maintaining one of said rise and said fall in a constant value for a predetermined time period.

4. A color synchronizing circuit in accordance with claim 3, wherein
said predetermined time period is selected to be a predetermined number of times the repetition frequency ($f_H$) of said color burst of said composite color signal.

5. A color synchronizing circuit in accordance with claim 2, wherein
said saw tooth waveform voltage generating means comprises
a third capacitor, and
charging/discharging means for charging said third capacitor in a predetermined period and for discharging said third capacitor in a predetermined period, and
said stepwise changing means comprises discharge control means acting on said charging/discharging means for intermittently discharging said third capacitor.

6. A color synchronizing circuit in accordance with claim 5, wherein
said control voltage generating means comprises low pass filter means for generating a direct current voltage associated with the amplitude of the output of said phase comparator means.

7. A color synchronizing circuit in accordance with claim 6, wherein
said low pass filter means comprises first time constant circuit means including a first capacitor.

8. A color synchronizing circuit in accordance with claim 6, wherein
said first capacitor and said third capacitor are implemented by a common capacitor.

9. A color synchronizing circuit in accordance with claim 5 or 8, wherein
said charging/discharging means comprises
a charging path for charging said third capacitor with a predetermined charging time constant and including first transistor means in said charging path, and
a discharging path for discharging said third capacitor with a predetermined discharging time constant and including second transistor means in said discharging path.

10. A color synchronizing circuit in accordance with claim 9, wherein
said sawtooth waveform voltage generating means comprises means for rendering non-conductive one of said first transistor means and said second transistor means while the other is in a conductive state.

11. A color synchronizing circuit in accordance with claim 9, wherein
said stepwise changing means comprises
a switching device interposed in said discharging path, and
on/off turning means for intermittently turning said switching device on/off.

12. A color synchronizing circuit in accordance with claim 11, wherein
the period of said intermittent turning on/off is selected depending on the repetition frequency ($f_H$) of said color burst.

13. A color synchronizing circuit in accordance with claim 5 or 8, wherein
said sawtooth waveform voltage generating means comprises means for controlling the amplitude of the terminal voltage of said third capacitor based on a forward voltage of a diode junction, whereby said predetermined relation ($\Delta f < \pm \Delta f_H$) is met irrespective of a temperature change.

14. A color synchronizing circuit in accordance with claim 1, wherein
said control voltage generating means comprises low pass filter means for generating a direct current voltage associated with the amplitude of the output of said phase comparator means, and
said pull-in range defining means comprises amplitude decreasing means for decreasing the amplitude of the output from said phase comparator means.

15. A color synchronizing circuit in accordance with claim 14, wherein
said low pass filter means comprises first time constant circuit means including a first capacitor, and
said amplitude decreasing means comprises second time constant circuit means responsive to the output of said first time constant circuit means and including a second capacitor.

16. A color synchronizing circuit in accordance with claim 1, wherein
said voltage controlled oscillator means comprises a ceramic vibrator.

17. A color synchronizing circuit in accordance with claim 1, wherein
said color process circuit comprises
color amplifier means for amplifying said composite color signal, and
color killer means for providing a signal for disabling said color amplifier means when a color burst is absent or when color synchronization is not established even in the presence of a color burst, and which further comprises
enabling/disabling means responsive to the output of said color killer means for selectively enabling or disabling said control voltage changing means.

18. A color synchronizing circuit in accordance with claim 17, which further comprises
color killer ineffective rendering means interposed between said color killer means and said color amplifier means for rendering ineffective the output of said color killer means during at least a color burst period.

19. A color synchronizing circuit in accordance with claim 17, wherein
said enabling/disabling means comprises
enabling means for enabling said control voltage changing means in the absence of said color burst, and
disabling means for disabling said control voltage changing means in the presence of said color burst and in the case of proper color synchronization.

20. A color synchronizing circuit in accordance with claim 1, wherein
said control voltage generating means comprises high impedance means connected to the load of said phase comparator means.

21. A color synchronizing circuit in accordance with claim 20, wherein
said high impedance means comprises emitter follower circuit means.

22. A color synchronizing circuit in accordance with claim 21, wherein
said emitter follower circuit means comprises a non-bias emitter follower circuit.

23. A color synchronizing circuit in accordance with claim 20, wherein
said high impedance means comprises emitter grounded type amplifier means.

24. A color synchronizing circuit in accordance with claim 23, wherein
said emitter grounded type amplifier means comprises a non-bias emitter grounded type amplifier.

25. A color synchronizing circuit in accordance with claim 1, wherein
said color process circuit comprises
color amplifier means for amplifying said composite color signal, and
color killer means for providing a signal for disabling said color amplifier means, and which further comprises
means for disabling said color killer means during a time period not contributing to a lock operation of said phase locked loop of said sawtooth waveform voltage.

26. A color synchronizing circuit in accordance with claim 25, which further comprises ACC detecting means for adjusting the gain of said color amplifier means, and means for disabling said ACC detecting means during said time period of said sawtooth waveform.

27. A color synchronizing circuit in accordance with claim 25 or 26, wherein said time period not contributing to the lock operation of said phase locked loop is a rise period of said sawtooth waveform.

28. A color synchronizing circuit included in a color process circuit for processing a composite color signal including a color signal and a color burst, and including phase locked loop means having a given pull-in range, said phase locked loop means including voltage controlled oscillator means responsive to a given control voltage for generating a color subcarrier signal, said voltage controlled oscillator means being structured such that a frequency variable range ($\Delta f$) is in a predetermined relation ($\Delta f < +f_H$) with respect to a repetition frequency ($f_H$) of said color burst, phase comparator means responsive to an intermittent color burst and the output of said voltage controlled oscillator means for comparing the phases thereof, and control voltage generating means responsive to the output of said phase comparator means for providing said control voltage to said voltage controlled oscillator means, said color synchronizing circuit comprising pull-in range defining means provided in association with said phase locked loop means for defining said pull-in range of said phase locked loop means in a predetermined range, and control voltage changing means provided in association with said phase locked loop means for forcedly changing said control voltage, said control voltage generating means further comprising low pass filter means for generating a direct current voltage associated with the amplitude of the output of said phase comparator means, and said pull-in range defining means comprising amplitude decreasing means for decreasing the amplitude of the output from said phase comparator means, said low pass filter means comprising first time constant circuit means including a first capacitor, and said amplitude decreasing means comprising second time constant circuit means responsive to the output of said first time constant circuit means and including a second capacitor, the time constant of said first time constant circuit being selected to be larger than the time constant of said second time constant circuit.

29. A color synchronizing circuit included in a color process circuit for processing a composite color signal including a color signal and a color burst, and including phase locked loop means having a given pull-in range, said phase locked loop means including voltage controlled oscillator means responsive to a given control voltage for generating a color subcarrier signal, said voltage controlled oscillator means being structured such that a frequency variable range ($\Delta f$) is in a predetermined relation ($\Delta f < +f_H$) with respect to a repetition frequency ($f_H$) of said color burst, phase comparator means responsive to an intermittent color burst and the output of said voltage controlled oscillator means for comparing the phases thereof, and control voltage generating means responsive to the output of said phase comparator means for providing said control voltage to said voltage controlled oscillator means, said color synchronizing circuit comprising pull-in range defining means provided in association with said phase locked loop means for defining said pull-in range of said phase locked loop means in a predetermined range, and control voltage changing means provided in association with said phase locked loop means for forcedly changing said control voltage, said color process circuit comprising color amplifier means for amplifying said composite color signal, and color killer means for providing a signal for disabling said color amplifier means when a color burst is absent or when color synchronization is not established even in the presence of a color burst, and which further comprises enabling/disabling means responsive to the output of said color killer means for selectively enabling or disabling said control voltage changing means, said color process circuit comprising R-Y demodulator means G-Y demodulator means and B-Y demodulator means, and said color killer means being operable responsive to the color burst demodulated output included in the outputs from said R-Y demodulator means or said G-Y demodulator means and said B-Y demodulator means.

30. A color synchronizing circuit in accordance with claim 29, which further comprises color amplifier means disabling means responsive to a negative color burst demodulated output from said R-Y demodulator means or said G-Y demodulator means or a positive color burst demodulated output from said B-Y demodulator means for disabling said color amplifier means.

31. A color synchronizing circuit in accordance with claim 30, wherein said color killer means comprises comparator means for receiving the output of said R-Y demodulator means or said G-Y demodulator means and the output from said B-Y demodulator means, and integrating circuit means for smoothing the output of said comparator means, said color killer means being responsive to the integrated output from said integrating circuit means for providing a signal for disabling said color amplifier means.

32. A color synchronizing circuit in accordance with claim 31, wherein said color amplifier means disabling means comprises auxiliary circuit means for receiving the output of said R-Y demodulator means or said G-Y demodulator means and the output from said B-Y demodulator means in a reversed relation in terms of the level as compared with those being applied to said comparator means, said integrating circuit means being operatively coupled to said auxiliary circuit means and responsive to the output of said auxiliary circuit means for being controlled.

33. A phase locked loop circuit for receiving a reference signal intermittently occurring at a predetermined repetition frequency, comprising:

voltage controlled oscillator means making oscillation at a frequency associated with a given control voltage, a frequency variable range of said voltage controlled oscillator means being selected to be in said repetition frequency of said reference signal, phase comparator means responsive to said intermittent reference signal and the output of said voltage controlled oscillator means for comparing the phases thereof, control voltage generating means responsive to the output of said phase comparator means for providing a control voltage to said voltage controlled oscillator means, means for decreasing the magnitude of said control voltage from said control voltage generating means, second control voltage generating means for generating a second control voltage changing in a predetermined fashion, and means for providing said first control voltage and said second control voltage in a superimposed manner to said voltage controlled oscillator means said second control voltage generating means comprising sawtooth waveform voltage generating means for generating a sawtooth waveform voltage.

34. A phase locked loop circuit in accordance with claim 33, wherein said sawtooth waveform voltage generating means comprises stepwise changing means for changing one of said rise and said fall in a stepwise manner.

35. A phase locked loop circuit in accordance with claim 33, wherein said first control voltage generating means comprises low pass filter means for generating a direct current voltage associated with the amplitude of the output of said phase comparator means.

36. A phase locked loop circuit in accordance with claim 35, wherein said low pass filter means and said amplitude decreasing means comprise a dual time constant circuit.

37. A color process circuit for processing a composite color signal including a color signal and a color burst, comprising:

color amplifier means for amplifying said composite color signal, color demodulating means responsive to said composite color signal from said color amplifier means for demodulating an R-Y signal, a B-Y signal and a G-Y signal, color killer means responsive to the color burst demodulated output included in said R-Y signal or said G-Y signal and said B-Y signal, and color amplifier disabling means responsive to a negative color burst demodulated output included in said R-Y signal or a positive color burst demodulated output included in said B-Y signal for disabling said color amplifier means.

38. A color process circuit in accordance with claim 37, wherein said color killer means comprises comparator means for receiving said R-Y signal and said B-Y signal, and integrating circuit means for smoothing the output of said comparator means, said color killer means being responsive to the integrated output from said integrating circuit means for providing a signal for disabling said color amplifier means.

39. A color process circuit in accordance with claim 38, wherein said color amplifier means disabling means comprises auxiliary circuit means for receiving said R-Y signal and said B-Y signal in a reversed relation in terms of the level as compared with those being applied to said comparator means, said integrating circuit means being operatively coupled to said auxiliary circuit means and responsive to the output of said auxiliary circuit means for being discharged.

* * * * *